United States Patent [19]

Byrne

[11] Patent Number: 5,737,703
[45] Date of Patent: Apr. 7, 1998

[54] MULTI-MODE RADIO TELEPHONE WHICH EXECUTES HANDOVER BETWEEN DIFFERENT SYSTEM

[75] Inventor: John Daniel Byrne, Shepperton, England

[73] Assignee: Nokia Mobile Phones Limited, Espoo, Finland

[21] Appl. No.: 543,479

[22] Filed: Oct. 16, 1995

[30] Foreign Application Priority Data

Dec. 23, 1994 [GB] United Kingdom ............. 9426467

[51] Int. Cl.⁶ ........................................... H04M 11/00
[52] U.S. Cl. ................................. 455/442; 455/436
[58] Field of Search ........................ 379/58, 59, 60, 379/61; 455/33.1, 33.2, 444, 442, 437, 436, 426

[56] References Cited

U.S. PATENT DOCUMENTS

| 4,989,230 | 1/1991 | Gillig | 379/59 |
|---|---|---|---|
| 5,127,042 | 6/1992 | Gillig . | |
| 5,212,684 | 5/1993 | MacNamee | 379/61 |
| 5,267,261 | 11/1993 | Blakeney, II | 455/442 |
| 5,293,380 | 3/1994 | Kondo | 379/60 |
| 5,406,615 | 4/1995 | Miller, II | 379/60 |
| 5,504,803 | 4/1996 | Yamada | 379/59 |
| 5,533,099 | 7/1996 | Byrne | 379/61 |
| 5,550,895 | 8/1996 | Burson | 379/61 |
| 5,574,775 | 11/1996 | Miller, II | 379/60 |
| 5,574,983 | 11/1996 | Douzono | 455/442 |
| 5,594,781 | 1/1997 | Kozdon | 455/442 |

FOREIGN PATENT DOCUMENTS

| 2265279 | 9/1993 | United Kingdom . |
|---|---|---|
| 2271917 | 4/1994 | United Kingdom . |
| WO88/08238 | 10/1988 | WIPO . |

*Primary Examiner*—Dwayne Bost
*Assistant Examiner*—Brian L. Johnson
*Attorney, Agent, or Firm*—Perman & Green, LLP

[57] ABSTRACT

A radio telephone automatically hands over a call from one radio telephone system to another radio telephone system. Communication with respective radio telephone systems may be simultaneously continued during handover until the handover is complete, or communication with one radio telephone system ceases before communication with the other radio telephone system commences. Delays between signals of different radio telephone systems which would cause audible interference are inhibited by FIR filtering and/or dynamic time-warping. If an handover fails then communication with the original radio telephone system is restarted or continued.

20 Claims, 6 Drawing Sheets

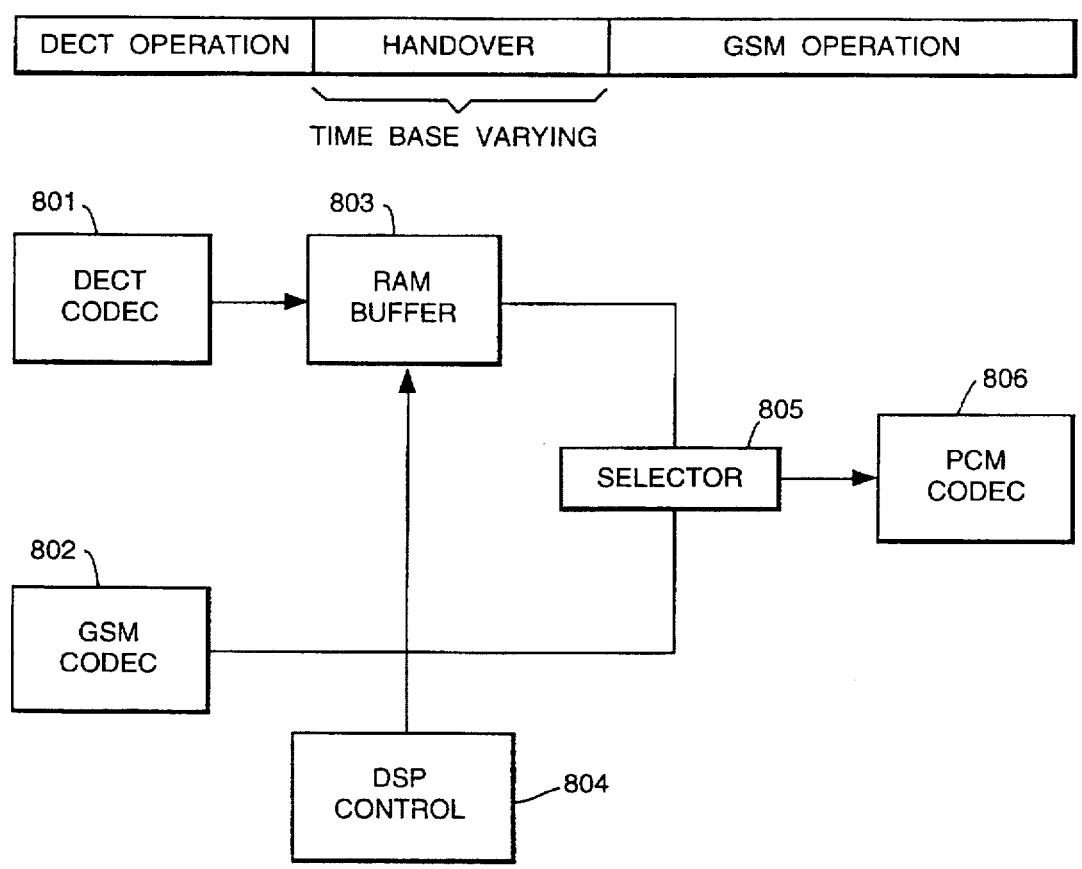

MULTI-MODE RADIO TELEPHONE WHICH EXECUTES HANDOVER BETWEEN DIFFERENT SYSTEM

FIELD OF INVENTION

The present invention relates to a multi-mode radio telephone, and in particular to a multi-mode radio telephone and a method therefor operable for more than one system.

BACKGROUND TO INVENTION

Over the last ten years there has been a rapid growth in the use and availability of radio telephone systems. As part of this growth there has been a proliferation of different types of radio telephone system, offering the user a variety of services, geographical coverage and cost. Many of these different radio telephone systems cover the same, or a part of the same, geographical area as each other.

Typically, different radio systems operate on different radio frequencies, utilise different modulation techniques, signalling techniques and intra-system protocols etc. to each other. Thus, a radio telephone designed for one system is generally unable to be used on another system. Thus if a user wishes to have access to more than one system it is necessary to have either more than one radio telephone or a radio telephone capable of operating in more than one system. Having more than one radio telephone is inconvenient for the user. Known radio telephones capable of operating in more than one system typically consist of little more than 2 separate phones combined in a signal housing. The preference for operating in a particular system is user defined as disclosed in U.S. Pat. No. 4,989,230.

A particularly useful and appropriate environment for multi-mode radio telephones is the recently available cellular and cordless telephone systems. In the prior art, cordless telephones are typically used in the home and office to allow the user to place and receive calls at any point throughout the house via an RF link with a home base station located within the house or office. Such cordless telephones are connected via the home base station to the user's telephone landline which in turn is connected to the Public Switched Telephone Network (PSTN). Further, there are known second generation cordless telephone systems such as CT-2 or DECT which are digital systems. Such CT-2 or DECT systems extend beyond conventional domestic operation of cordless telephones by allowing the user to establish an RF link between a CT-2 or DECT radio telephone and a base station in a more publicly accessible location e.g. outside of the user's home, a railway station, shopping mall or airport. Such base stations are known as telepoint base stations and are linked to the PSTN in much the same way as a home base station. Some cordless, and in particular DECT radio telephones, are now able to receive calls via telepoint base stations whereas hitherto they were only able to place them. A description of such a system can be found in PCT international patent application WO 92/03006. Thus, placing and receiving calls whilst geographically roaming is possible in cordless telephone systems.

However, cordless telephone systems are low power systems and each base station provides telecommunications within only approximately a 150 meter radius of the base station, dependent upon the terrain and any man-made objects which could interfere with signalling between a cordless telephone and the base station. Such systems are generally only used in areas of high user density and thus tend to be limited to urban areas. This clearly restricts the geographical mobility of a CT-2, DECT or the like cordless telephone user.

In the prior art there are known so called cellular radio telephone systems having base stations which cover a wide geographical area (cell), eg 35 km diameter. However, in urban areas where the user density is high the cells are much smaller and operate at lower powers to facilitate frequency re-use thereby increasing the communication channel density.

Cellular systems have advantages over cordless systems since they allow a user to place and receive calls over a large area. Additionally they are suitable for use in moving vehicles. This is because cellular telephone systems have sophisticated handover procedures to facilitate switching between cells as a user's vehicle crosses from one cell to another. Furthermore, the cells are larger than in cordless systems and thus handovers occur less often, even if travelling in a vehicle. This ensures continuity of service and is particularly important during a call. However, the cost of a cellular telephone call is significantly greater than the cost of a cordless telephone call, since cordless telephone calls are made by way of the user's land line PSTN link and cost the same as landline calls, whilst cellular telephone calls are made by way of expensive cellular base stations and cellular switching equipment and cost much more than land line telephone calls.

In order for a user to be able to utilise both cellular and cordless telephone cellular system and the cordless system are monitored by the CCT for incoming calls and the CCT automatically enters a user defined preferred mode for answering the incoming call if the system corresponding to that mode is available. When placing a call the use initiates the call as either cellular or cordless and the CCT connects the call appropriately.

In order to fully utilise the available radio telephone systems it is desirable for intersystem handover to be possible during an on-going call on a particular system. However, as mentioned earlier different radio telephone systems are generally incompatible with each other, e.g. cordless telephone systems and cellular telephone systems and this poses problems in performing inter-system handover, in particular, their handover procedures are different. For example, in cordless telephone systems the handover procedure is usually initiated by the radio telephone terminal. In a cordless telephone system, when a cordless telephone considers it necessary to change from one cordless base station to another, the cordless telephone scans its frequency band and selects the appropriate cordless base station to handover to. However, in most cellular telephone systems handover is controlled by the cellular telephone system network. Typically, a cellular radio telephone monitors only the quality of the radio connection and forwards the monitored results to a cellular system network. One of the network elements, for example a cellular exchange, makes a decision regarding handover on the basis of the obtained information.

Additionally, most existing cellular systems use a "break then make" handover sequence in which communication between a radio telephone and the network via a first base station is broken under control of the network. Subsequently, the network attempts to re-open a communication channel with the radio telephone via a second base station. Such a system results in speech interruption, and loss of communication should the second base station fail to establish communication with the radio telephone. Such problems are exacerbated if a similar handover sequence is attempted between systems.

Another difficulty is that the speech coding/decoding is typically different for respective radio telephone systems.

Thus, the respective speech delays are also different which gives rise to possible discontinuities during an attempted intersystem handover. Additionally, routing delays and audio levels for respective radio telephone systems may be different. This would give rise to inter-symbol interference, general interference, undesirable sudden changes in audio levels and other like degradations in performance.

Furthermore, there is likely to be signalling and network delay during an attempted handover between systems which is greater than that typically experienced for handover between cells of the same radio telephone system.

In known CCT units as disclosed in U.S. Pat. No. 4,989,230, the user is required to select transfer of a call from one system to another. This imposes an onus on the user which he may not wish to have or be able to discharge since the relative quality of systems may be unknown to him. For example, one of the disadvantages of the CCT disclosed in U.S. Pat. 4,989,230 is a user might not know if a signal is deteriorating until it is too late and the ongoing call is lost. For example, a visual indication of poor signal shown on the CCT is likely to be missed by a user, since in use the CCT will be placed at the side of the user's head and thus visual indications would not be visible to the user. Other indications such as an audible tone or alarm would interfere with the user's ongoing call, and would be annoying and irritating to the user.

BRIEF SUMMARY OF INVENTION

A first aspect of the invention provides a radio telephone operable for more than one radio telephone system, comprising communication means respectively associated with each of the radio telephone systems and control means for controlling the communication means, wherein a first communication means is responsive to the control means to automatically cease communication with a first radio system and a second communication means is substantially simultaneously responsive to the control means to automatically commence communication with a second radio system to effect handover of a call from a first radio telephone system to a second radio telephone system, and a second aspect of the invention provides a method of operating a radio telephone for more than one radio telephone system, comprising respectively communicating with each of the radio telephone systems, automatically ceasing communication with a first radio system and automatically commencing communication with a second radio system for effecting handover of a call between respective radio systems.

Apparatus and method in accordance with the invention have the advantage that a call may be automatically carried out using the radio telephone system having the highest, signal quality or the lowest cost.

Additionally, if a currently used radio telephone system coverage does not extend to an area into which a user travels during a call, then handover can be made to a radio telephone system that is available.

In a preferred embodiment the first and second of the communication means are responsive to the control means to substantially simultaneously communicate with respective radio systems during said handover of a call from the first radio system to the second radio system for communicating with said respective radio systems substantially simultaneously during said handover of a call from the first radio system to the second radio system. This has the advantage that the radio telephone is in communication with at least one of the radio telephone systems, thereby inhibiting any loss of call or communication. The handover can be suitably effected by the radio telephone which reduces processing overheads for the radio telephone systems. In the event that handover cannot be made, then the call can easily be continued with the first radio telephone systems, whereas if communication had ceased with the first radio telephone system before making communication with the second radio telephone system then the call would have to be re-established with the first radio telephone system.

Typically, both speech and control signals are communicated to respective radio telephone systems during handover.

Audible effects due to the differences in delays or arrival of signals from respective radio telephone systems can be inhibited by summing speech streams from respective radio telephone systems to form a single speech stream, wherein respective speech streams have varying gain such that a first speech stream undergoes increasing attenuation and a second speech stream undergoes increasing gain during handover of a call from the first radio telephone system to the second radio system. A Finite Impulse Response (FIR) filter can filter the combined speech streams in order to inhibit any audible discontinuities. This results in the audible speech signal appearing substantially continuous and results in quality speech.

Apparatus and method in accordance with the invention are readily applicable to combined cellular and cordless telephones, in particular GSM and DECT telephones.

BRIEF DESCRIPTION OF THE DRAWINGS

FIG. 8 is a more detailed circuit of the embodiment of FIG. 7.

DETAILED DESCRIPTION OF EMBODIMENTS OF THE INVENTION

Specific embodiments of the invention will now be described, by way of example only, and with reference to the drawings.

Figure 1:
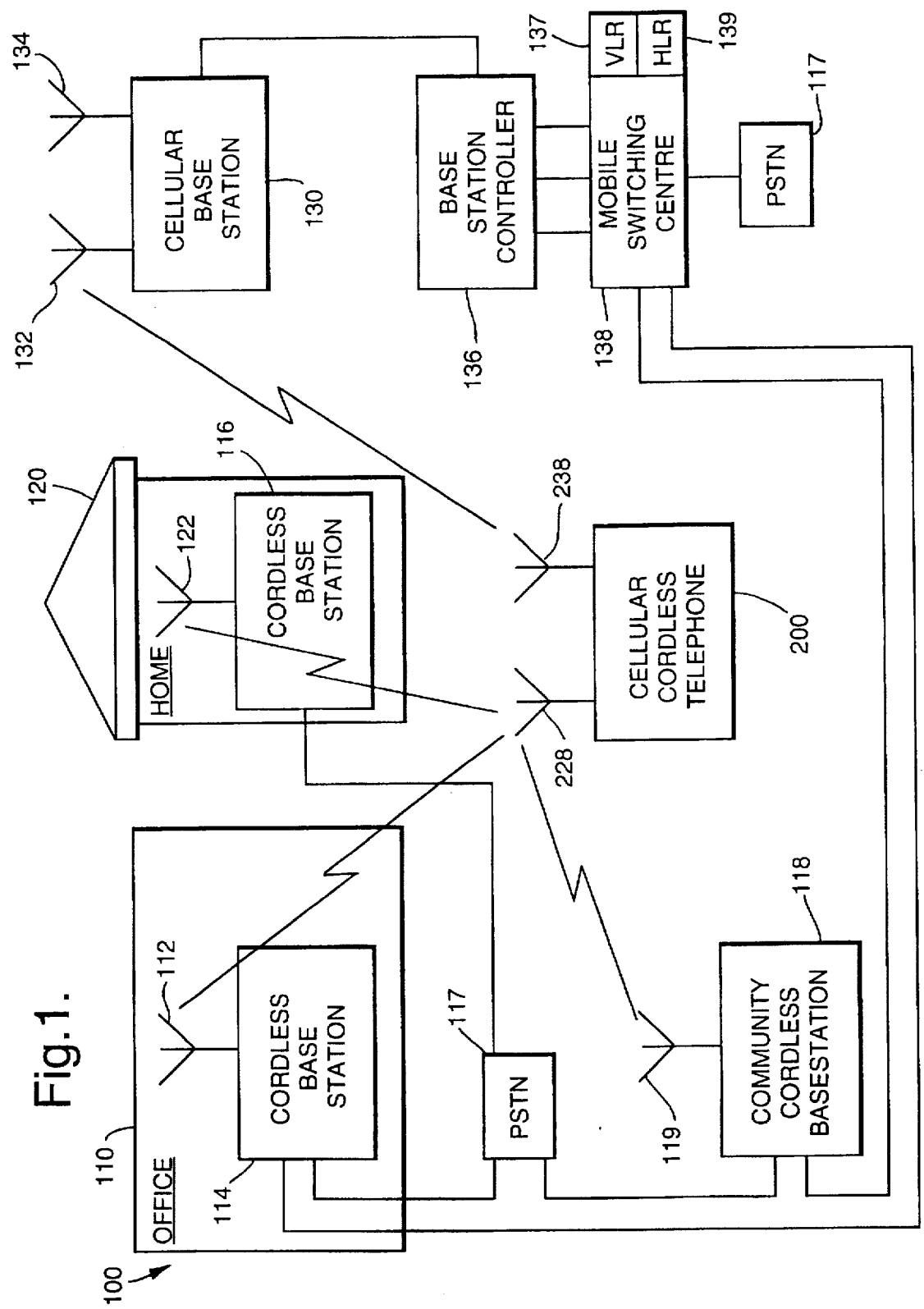
FIG. 1 is a block diagram of a cellular cordless telephone system embodying the present invention.

FIG. 1 illustrates a block diagram of a cellular cordless telephone system 100 which embodies the present invention. The system includes a Public Switched Telephone Network (PSTN) 117, connected by landlines to cordless base stations 114, 116 and 118 having respective landline telephone numbers and respectively located in an office building 110, domestic residence 120 or some other geographical location.

Cordless base stations 114, 116 and 118 communicate with the cellular cordless telephone (CCT) 200 via antennas 112, 119 and 122. Antennas 112, 119 and 122 may be implemented as any sort of suitable antenna such as a whip antenna, helical antenna or printed circuit antenna. The cordless base stations 114 and 116 may be a conventional cordless base station. Cordless base station 118 is a community cordless base station and such base stations may be located throughout an urban area, or common user area such as a railway station, shopping mall or airport, for providing a shared telephone service to CCTs 200. In such a case, the cordless base station 118 may include additional equipment not usually found in conventional cordless base stations for billing calls to a telephone number of CCT 200.

Also connected through telephone landlines to the PSTN 117 is the Mobile Switching Centre (MSC) 138 associated with Base Station Controller(s) (BSC) 136 for controlling Cellular Base Station(s) 130. Cellular base station 130 comprises both a receive antenna 132 and a transmit antenna 134 for communicating with CCTs 200.

Figure 2:
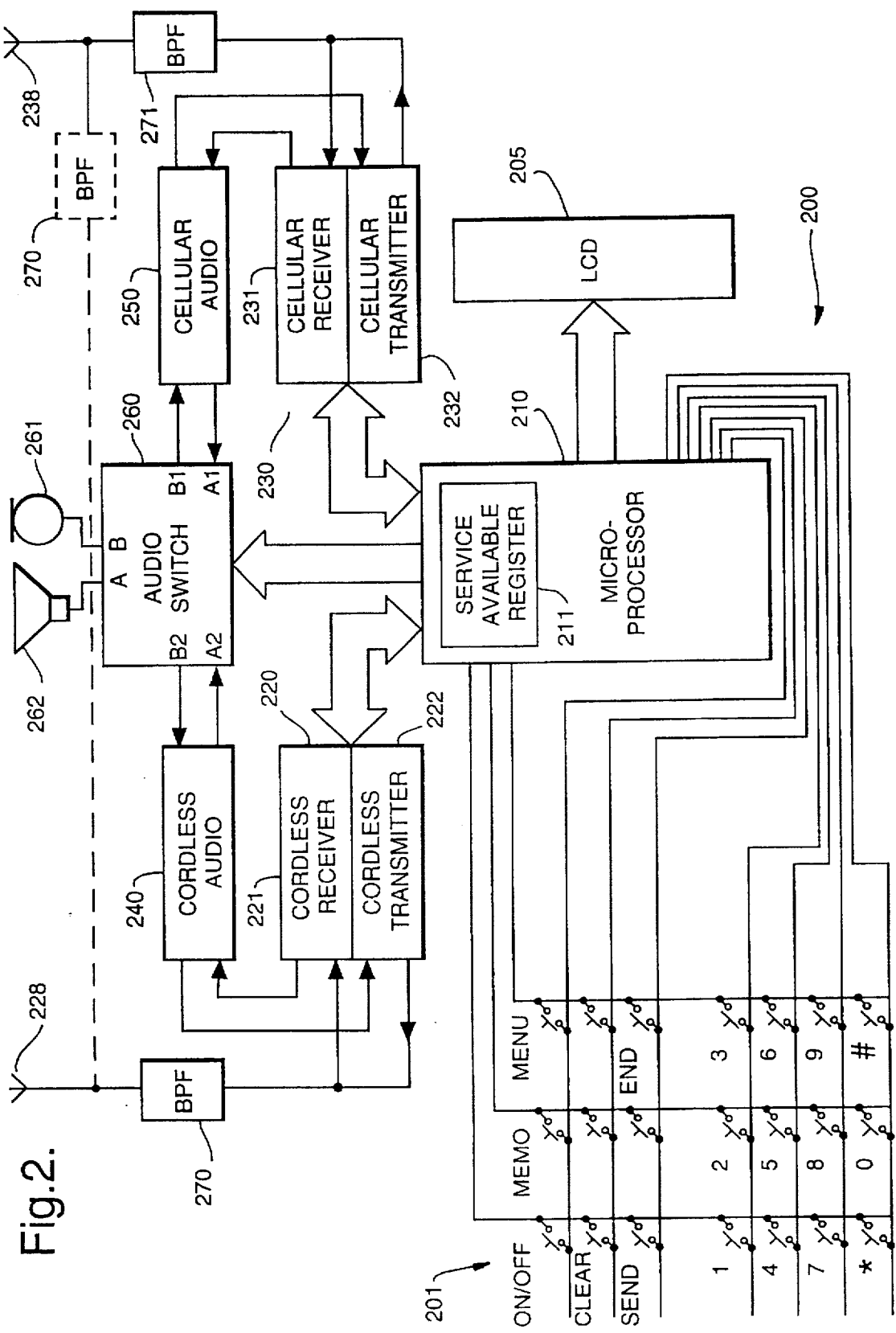
FIG. 2 is a block diagram of a cellular cordless telephone embodying the present invention.

The CCT 200 may be a mobile unit installed in a vehicle, a so called transportable unit or a hand held portable unit. CCT 200 comprises an antenna 228 for cordless communication and an antenna 238 for cellular communication. The CCT 200 may alternatively comprise a single antenna 238 for both cellular and cordless communication and arranged as illustrated in FIG. 2 by the dotted line 272. Typically in the UK cordless telephone systems operate in frequency bands at 49 MHz (CT0), 860 MHz (CT2) and 1880–1900 MHz (DECT) and cellular telephone systems in frequency bands 890–905 MHz and 935–950 MHz (TACS), 905–915 MHz and 950–960 MHz (GSM) or 1800 MHz (DCS).

FIG. 2 illustrates a detailed block diagram of an embodiment of a CCT 200 in accordance with the present invention. CCT 200 comprises a cellular telephone transceiver 230, and antenna 238, a cordless telephone transceiver 220 and antenna 228, a microprocessor 210, keypad 201, display 205, audio switch 260, microphone 261 and speaker 262. The microphone 261, speaker 262 and keypad 201 may alternatively be located in a handset separate from the rest of the CCT 200. An alternative embodiment is shown by dashed line 272, in which cordless transceiver 220 and cellular transceiver 230 may be coupled to a single antenna 238 by way of band pass filters (BPF) 270 and (BPF) 271, respectively. Cordless telephone transceiver 220 may be any conventional cordless transceiver. However, it would be advantageous if the cordless telephone transceiver 220 conformed to a common air interface for cordless telephones, since this would facilitate roaming of the CCT 200 between different cordless systems. An example of such an interface is the recently introduced common air interface CAI for CT2 cordless systems. The cellular transceiver 230 may likewise be any conventional cellular transceiver. The keypad 201, microprocessor 210, display 205 and the like can be any available type, connected and arranged to operate in the CCT 200. The microprocessor 210 includes a Service Available Register (SAR) 211 for storing which radio systems are currently available to the CCT 200.

The microprocessor 210 illustrated in FIG. 2 is adapted to control the CCT 200 as a cordless telephone, a cellular telephone or a cellular cordless telephone. Thus, the CCT 200 may operate, as far as a user is concerned, simultaneously as a cellular telephone and a cordless telephone. For the sake of explanation and clarity, it should be noted that the CCT 200 can be so arranged such that both cellular and cordless operations are in progress at the same time. Alternatively, if components are shared between cellular and cordless parts, cellular and cordless operations can be performed at different times although this would be done at a speed sufficient for it to be undetectable by the user and therefore appear to be simultaneous operation.

When operating as a cordless telephone control signals from the microprocessor 210 enable cordless receiver 221 and cordless transmitter 222. The microprocessor 210 also monitors signals from the cordless receiver 221 indicating received signal strength and for detecting receive data, and from the cordless transmitter 222 for sending transmit data. Additionally, the microprocessor 210 monitors control signals from the cordless transceiver 220 for detecting incoming calls (ringing), security codes and broadcast information relevant to the cordless system, and for sending dialling information.

The microprocessor 210 controls the CCT 200 in a similar way when operating as a cellular telephone, but appropriately modified for the signalling protocols and data encryption used in the cellular system. The signalling protocols, data encryption techniques and the like used in respective telephone systems are well known in the art, and the microprocessor can be arranged to operate in a known manner to effect control of the signals in such systems.

The audio switch 260 is controlled by the microprocessor 210 to link the cordless audio channel 240 or the cellular audio channel 250 to the microphone 261 and loudspeaker 262 as appropriate.

The operation of a CCT 200 is described in detail in co-pending UK Patent Application No. 9326189.9. Briefly, the CCT 200 monitors the radio system availability and registers with a radio system (known as the preferred system) fulfilling a certain predetermined criterion or criteria, such a cost per call, bit error rate or such like. The CCT 200 continuously monitors for radio system availability, and automatically selects and re-selects radio systems according to the aforementioned criterion or criteria. Due to the automatic selection and re-selection of radio systems there exists the possibility of a new or different radio system being selected whilst the use is in a call, which would require handover of the call between the original radio system and the new or different radio system as discussed earlier together with the attendant problems.

In order for efficient and effective inter-system handover to be possible it is desirable that the different systems are interlinked so as to have knowledge of the geographical and/or system location of a particular CCT 200. In such an interlinked system, a call originating in a non-preferred system could be automatically redirected and handed over to the preferred system.

A radio telephone and radio systems suitable for such operation would be a combined GSM/DECT CCT 200 operable in an environment in which both GSM and DECT are individually or simultaneously available. In the GSM system the cellular base stations 130 are connected to Mobile Switching Centres (MSCs) 138 which themselves may be connected to other MSCs, the PSTN 117 (as shown in FIG. 1) comprising the Integrated Services Digital Network (ISDN), or the like. The MSC 138 is also connected to a Visitor Location Register VLR 137, which is a data base of GSM subscriber files of GSM subscribers visiting the area of the MSC 138 to which the VLR relates. The MSC 138 also has a Home Location Register HLR 139 which is a database of all the subscribers having that particular MSC 138 as their home MSC. The MSC 138 is also connected to other elements of the GSM network such as an Authentication Centre AC and an Equipment Identity Register EIR. A more detailed description of the GSM system may be found in a book entitled "The GSM system for mobile communications", M. Mouly and M. Pautet, Palaiseau, France, ISBN: 2 9507190-0-7.

A cellular telephone or CCT 200 operating in a MSC area communicates with the MSC via a base station in order to register its presence in the geographical area assigned to that particular MSC. Such registration may be carried out by a dual system GSM/DECT CCT 200 whilst it monitors the availability of the GSM system. Thus, the location of a CCT 200 phone within the GSM system would be known. Since the MSC 138 is connected to the PSTN 117, the location of a CCT 200 in the GSM system can also be known to the DECT system since the system is connected to DECT via the land line PSTN system. DECT phones, in common with CT-2 type phones, are capable of being paged via community base stations as well as domestic base stations. Thus, knowledge of the location of a DECT or CT-2 phone must be possessed by the relevant cordless system. An example of such a cordless telephone system is disclosed in international application no. WO 92/03006. In the cordless system disclosed in WO 92/03006, a cordless telephone pre-registers with a cordless base station indicating to a network control centre (connected to the PSTN) the location of the cordless telephone. A combined GSM/DECT CCT 200 may perform the pre-registering during the monitoring for the availability of the GSM and DECT systems. Since the network control centre (Central Control Fixed Part (CCFP) of the cordless system (DECT) is connected to the PSTN, and the PSTN in turn is connected to the MSC of the GSM system, both the network control centre and the MSC may have access to the whereabouts of respective GSM and DECT phone numbers. However, the signalling between the network control centre of the cordless system and the MSC would need to be very fast, and need to utilise the ISDN of the PSTN.

Figure 3:
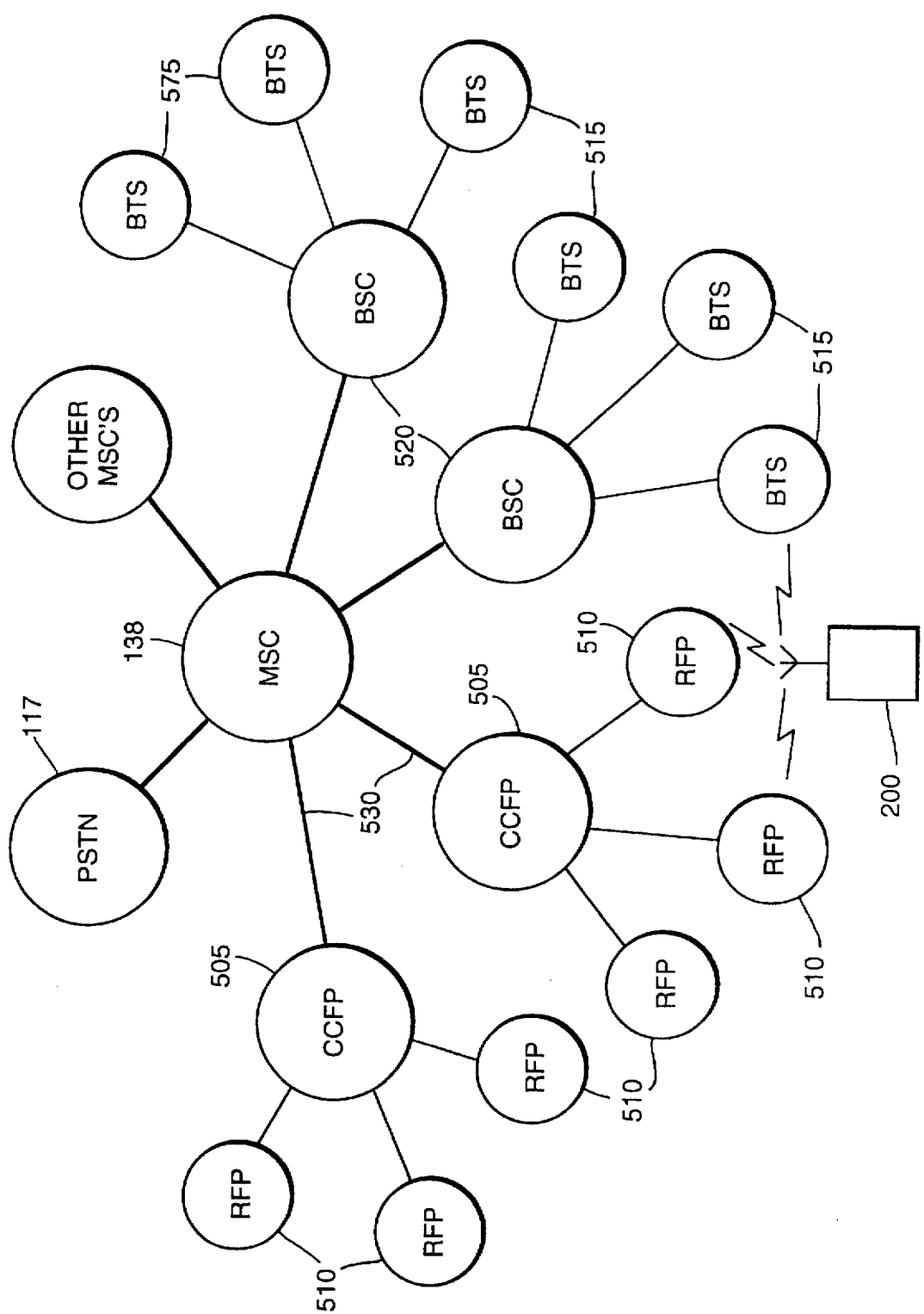
FIG. 3 is a block diagram of a combined DECT/GSM network.

An alternative GSM/DECT combined system is shown schematically in FIG. 3. In this system, within the area of each GSM MSC 138, there are a number of Central Control Fixed Parts (CCFP) 505. Each CCFP 505 controls a number of cordless base stations, known as Radio Fixed Parts (RFP) 510 in the DECT system, and is connected directly to its local MSC 138. Such direct connections 530 may be by land line or preferably by line of sight radio communication. The RFPs 510 and CCFP 505 may comprise a community DECT system in an airport or the like, or may comprise a private office based DECT system. Access to the PSTN from the DECT system is then via the MSC 138 of the GSM system. Calls made from DECT to the PSTN and vice versa, via the MSC 138 would not need to be any more expensive than other non-cellular/GSM calls, since the complex switching and handover protocols required for GSM is not necessary. The MSC 138 can also be connected to Base Station Controllers (BSC's) 520 which in turn are connected to and control Base Transceiver stations (BTS) 515, forming part of the conventional GSM system.

The direct link 530 between the CCFP 505 and MSC 138 has an information bandwidth of typically 2 Mbits/s. Such a bandwidth is capable of transmitting the necessary control signals between the MSC 138 and the CCFP 505 to facilitate automatic paging between systems and handover between systems. Furthermore, the CCFP 505 of the DECT system may have access to the VLR 137, HLR 139, AC and EIR of MSC 138 via the direct link 530. Thus, each CCFP 505 can monitor the whereabouts of other radio telephones and can also use the security checks provided by the GSM system to monitor radio telephones logged onto the DECT system.

A CCT 200 in accordance with the present invention and operating as a GSM/DECT CCT 200 in either GSM/DECT environment as described above, may register with whichever system fulfils the criteria for operating the CCT 200 in a particular system. Alternatively, the CCT 200 may register with both systems but preferably operate in only one of them. Thus a call originating on any particular system will be directed via the MSC, PSTN and network control centre as appropriate to the system on which the paged CCT 200 is registered, or to the system for which the paged CCT 200 has indicated a preference.

Additionally, inter system knowledge of the location of CCTs 200 will facilitate handover during calls. For example, if a CCT 200 having a call in progress on a non-preferred system enters the service area of a preferred system then the CCT 200 can register with the preferred system, and flag to the system MSC or network control centre that it is a preferred system. Then, the preferred system MSC or network control centre can communicate with the non-preferred system's MSC or network control centre and instruct it to handover the call to the preferred system.

An apparatus and method in accordance with the present invention provides automatic inter-system call handover by utilising so-called seamless handover (no break then make) or non-seamless handover (break then make).

In seamless handover, a connection to a new radio telephone system is made before breaking the existing connection with the old system. This is facilitated in a CCT 200 having independently operative DECT and GSM transceiver section 220, 230. This can be either CCT 200 initiated and controlled or network initiated and controlled. Even if respective DECT and GSM transceiver sections 220, 230 have common components, by intermittently operating respective transceivers sufficiently quickly such that the operation in each system is effectively continuous, simultaneous operation in both systems may be effectively achieved.

The steps during a seamless handover initiated and controlled by the CCT 200 are given below:

i) the CCT 200 decides or is told by the system that a handover to another system is required;

ii) CCT 200 sets up a connection with a new system providing that such a new system is available;

iii) "double connection" problems due to speech data at different rates, delays or codes are accounted for during the "double connection";

iv) CCT 200 maintains both connections for a period of time to monitor the quality of both connections;

v) CCT 200 releases one or other of the connections dependent upon their quality; and vi) handover completed.

If the quality of the new connection is poor then the CCT 200 should have the option of not handing over to that new system. However, typically the CCT 200 will already know the quality of communications with respective systems and will only attempt handover if the communication with the new system is going to be good.

The problems mentioned at part iii) above arise because in the GSM system, for example, there is a:

i) 20 ms delay between speech frames;

ii) finite time to encode/decode the speech (~5 ms);

iii) delay due to de/interleaving (~74 ms);

iv) channel coding delay; and v) TDMA frame delay (3.615 ms), which give a total delay of the order of a hundred milliseconds.

However, in the DECT system for example, there is a much shorter delay of 10 ms due to the delay, between frames.

Thus, in a handover from a GSM network to a DECT network for example, speech samples will be missed and some form of interpolation from the DECT speech stream to the GSM speech stream, or extrapolation from the GSM speech stream to the DECT speech stream is required. On the other hand, in a handover from a DECT network to a GSM network there is a repetition of speech samples, and thus it is necessary to:

i) accept such repetition;
ii) mute repeated speech, or
iii) insert an increasing delay period during handover, i.e. slow down DECT speech stream to build a delay equivalent to that in the GSM system.

Figure 4:
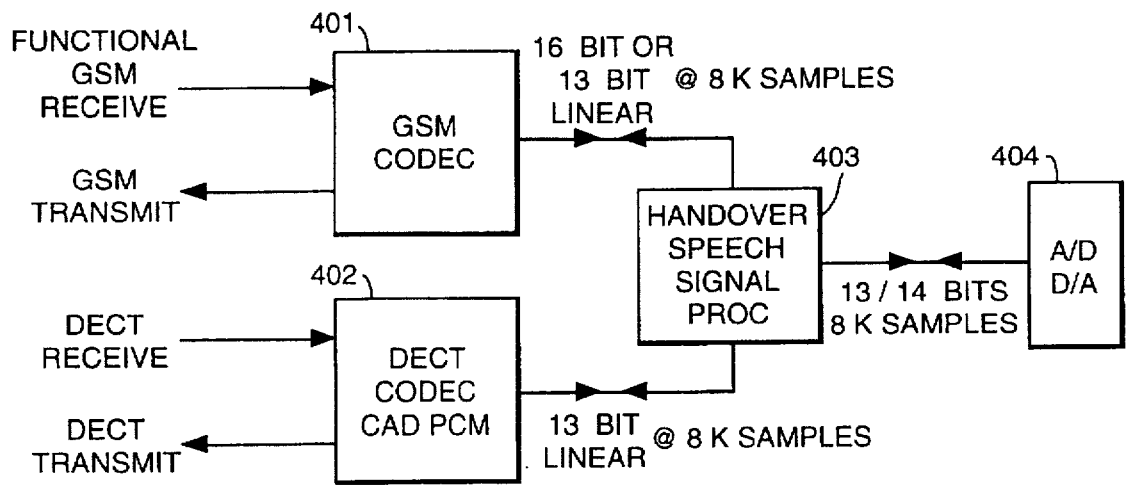
FIG. 4 is a circuit diagram of a frist embodiment in accordance with the invention.
Figure 5:
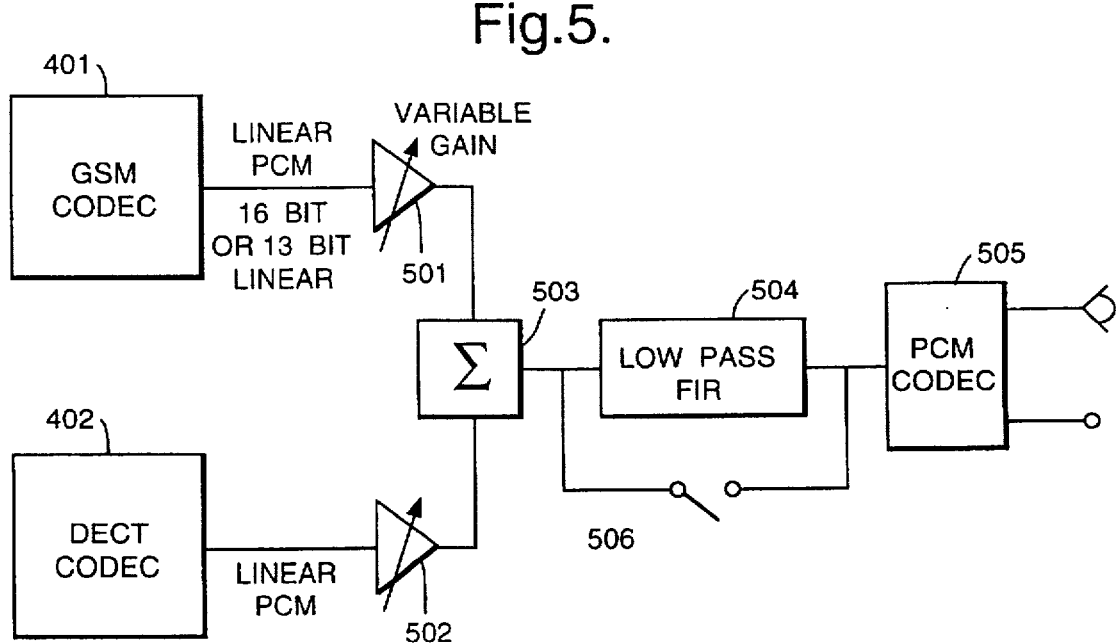
FIG. 5 is a more detailed circuit diagram of the embodiment in FIG. 4.

FIG. 4 shows a relatively simple signal processing circuit for speech handover between a GSM and a DECT network. A more detailed example of a signal processing circuit is shown in FIG. 5, and an example of a Finite Impulse Response (FIR) filter is shown in FIG. 6.

Speech signals from the GSM and DECT networks are decoded in respective codecs 401 and 402. The outputs of codecs 401 and 402 are input to respective variable gain elements 501 and 502. The outputs of variable gain elements 501 and 502 are combined in summing element 503 and input to the PCM codec 505 directly or via Low Pass Filter 504. During a handover, the gain of speech signals from the codec corresponding to the current radio network is decreased, whilst the gain of speech signals from the codec corresponding to the destination radio telephone network is increased. Substantially constant audio volume is maintained by this system to inhibit disconcerting and irritating audible changes in volume for the user. The summing element 504 adds the two appropriately amplified speech streams together to form a single speech signal.

Figure 6:
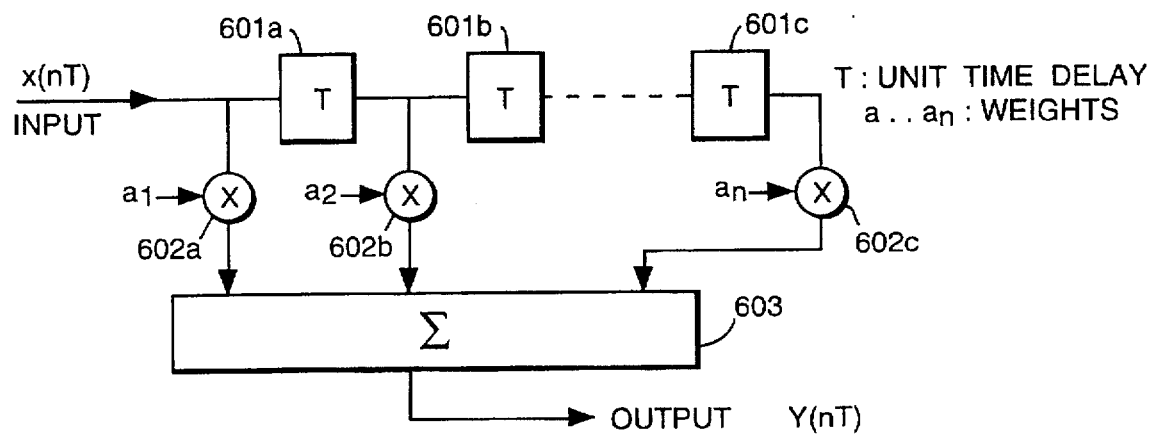
FIG. 6 shows a Finite Impulse Response filter.

The low pass filter 504 shown in detail in FIG. 6 is used to ensure that no disturbing effects due to handover discontinuous are observed by the user. This filter can be switched out 506 for non-handover operation. In addition the filter coefficients or weights 601 may be varied during the handover process.

The FIR filter can be implemented by well known techniques which calculate the time delays T, number of taps and weighting coefficients $a_i$ required to convert an analogue filter response to a digital response and implement the analogue filter response digitally.

Figure 7:
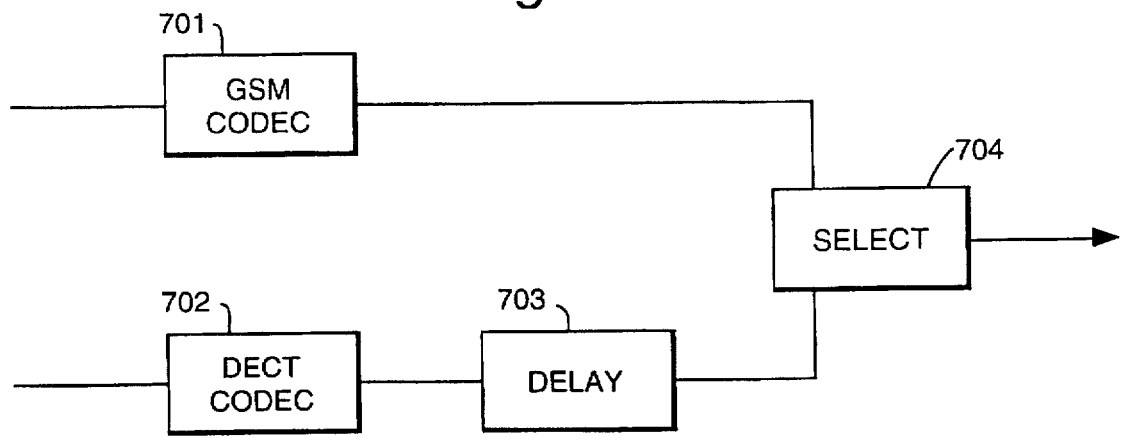
FIG. 7 is a circuit diagram of a second embodiment in accordance with the invention.

Optionally, the DECT speech stream can be held in a delay utilising a circuit as shown in FIG. 7. The required delay can be predicted by the CCT 200, or respective network handling the handover, knowing the different system delays. The delay can also be calculated by the CCT 200, or network, by correlating respective system speech streams. The delay can be retained at its maximum or worst case value during the handover until handover is completed, or the delay can be slowly reduced by missing speech samples during the handover in order to reduce the perception of delay to the user.

The missing speech frames may also be left out since the delays between speech from respective systems are known or estimated by cross correlation of the two speech streams. However, this is likely to cause unacceptable degradation in the audible signal to the user.

To account for the extra speech when handing over from DECT to GSM the circuit as shown in FIG. 7, and in detail in FIG. 8, may again be utilised. In this case, the delay is slowly inserted into the DECT speech stream during the period when connection to both systems has been made and both speech streams are there. Again, the delay in the DECT speech stream can be increased by missing speech samples or repeating samples, until correlation with the GSM speech stream is achieved at which point handover is completed. The time base of the DECT samples is varied in order to synchronise with the GSM data. This process is carried out during the handover period.

The circuit in FIG. 8 shows a DECT code/decoder (CODEC) 801 coupled to a RAM buffer 803 corresponding to delay 703 shown in FIG. 7. The RAM buffer 803 is under the control of DSP controller 804, and the output from the buffer 803 is coupled to selector 805. The output from GSM CODEC 802 is coupled directly to an input of selector 805. The output of selector 805 is coupled to (Pulse Code Modulation) PCM CODEC 806.

The DECT CODEC 801 loads up the buffer 803 with speech samples and repeats intermittent speech samples for transmission to the PCM CODEC 806 under control of DSP controller 804. Gradually, the GSM speech samples will "catch up" with the DECT speech samples, and then the selector 805 can select the GSM speech CODEC output to the PCM CODEC 806. Such repetition of single speech samples would not be noticeable to a user. Optionally, the clock rate of PCM CODEC 806 can be decreased from the standard 8 kHz. However, varying the crock rate of the PCM CODEC 806 will tend the change its filtering characteristics.

Circuitry as shown in FIG. 8 can also be used for handover from GSM to DECT. In this case the output from the GSM CODEC 802 fills up the buffer 803 and deletes intermittent speech samples in order to allow the GSM speech samples to "catch up" with the DECT speech samples. Once the GSM and DECT speech samples are correlated, the selector 805 switches over the DECT speech stream and sends DECT signals to the PCM CODEC 806.

The foregoing method can be applied in all cases, but has the disadvantage of delaying the DECT portion. Speech delay is a parameter associated with speech quality, as when combined with other network delays, e.g. satellite transmission, this can cause problems to the user. If non-seamless handover is effected then problems with delay are more difficult to overcome since correlation with the speech stream of the target system is unobtainable. However, the delay can be predicted and the aforementioned circuits and methods utilised in compensating for such delay.

In view of the foregoing description it will be evident to a person skilled in the art that various modifications may be made within the scope of the invention. In particular it will be understood by persons skilled in the art that delays and correlation can be carried out by known methods. Also, implementation of handover can be initiated and carried out by the CCT or network, or a combination of both. Additionally, where circuits have been described with reference to individual circuit elements, it will be understood that such circuits may also be implemented by a dedicated signal processor such as an ASIC.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What I claim is:

1. A radio telephone operable for more than one different radio telephone system having different operational protocols, comprising communication means respectively associated with each of the different radio telephone systems and control means for controlling the communication means, wherein a first communication means is responsive to the control means to automatically cease communication with a first radio system and a second communication means is substantially simultaneously responsive to the control means to automatically commence communication with a second radio system to effect handover of a call from a first radio telephone system to a second radio telephone system, wherein the telephone further comprises signal processing means adapted to inhibit sudden change in audio signals during handover.

2. A radio telephone according to claim 1, wherein the first and second of the communication means are responsive to the control means to substantially simultaneously communicate with respective radio systems during said handover of a call from the first radio system to the second radio system.

3. A radio telephone according to claim 1, wherein the communications means communicates both speech signals and control signals to respective radio telephone systems.

4. A radio telephone according to claim 1, wherein communication with the first radio system is continued in the event of a handover failure.

5. A radio telephone according to claim 1, wherein the signal processing means comprises means for adapting signals in the first and second radio systems to overcome delays between said signals.

6. A radio telephone according to claim 5, wherein a first speech stream corresponding to the first radio system undergoes gradual attenuation during the handover of a call from the first radio telephone system to the second radio telephone system, a second speech signal corresponding to the second radio system undergoes gradual increasing amplification during handover, and the attenuated first speech signal and amplified second speech signal are combined to produce a single speech signal.

7. A radio telephone according to claim 5, wherein portions of a received first speech stream corresponding to the first radio telephone system are repeated in order to bring the first speech stream substantially into correspondence with a second speech stream corresponding to the second radio telephone system during the handover of a call from the first radio telephone system to the second radio telephone system.

8. A radio telephone according to claim 5, wherein portions of a received first speech stream corresponding to the first radio telephone system are removed in order to bring the first speech stream substantially into correspondence with a second speech stream corresponding to the second radio telephone system during the handover of a call from the first radio telephone system to the second radio telephone system.

9. A radio telephone according to claim 1 and adapted to be operable in a cellular radio telephone system and a cordless radio telephone system.

10. A radio telephone according to claim 9, wherein the cellular-radio telephone system is a GSM system and the cordless radio telephone system is a DECT system.

11. A method of operating a radio telephone for more than one different radio telephone system having different operational protocols, comprising respectively communicating with each of the different radio telephone systems, automatically ceasing communication with a first radio system and automatically commencing communication with a second radio system for effecting handover of a call between respective radio systems, and wherein signal processing is utilized to inhibit sudden changes in audio signals during handover.

12. A method according to claim 11, further comprising communicating with said respective radio systems substantially simultaneously during said handover of a call from the first radio system to the second radio system.

13. A method according to claim 11, wherein both speech signals and control signals are communicated to respective radio systems.

14. A method according to claim 11, wherein communication with the first radio system is continued in the event of a handover failure.

15. A method according to claim 11, wherein signals in the first and second radio system are adapted to overcome delays between said signals.

16. A method according to claim 11, wherein a first speech stream corresponding to the first radio system undergoes gradual attenuation during the handover of a call from the first radio telephone system to the second radio telephone system, a second speech signal corresponding to the second radio system undergoes gradual increasing amplification during handover, and the attenuated first speech signal and amplified second speech signal are combined to produce a single speech signal.

17. A method according to claim 11, wherein portions of a received first speech stream corresponding to the first radio telephone system are repeated in order to bring the first speech stream substantially into correlation with a second speech stream corresponding to the second radio telephone system during the handover of a call from the first radio telephone system to the second radio telephone system.

18. A method according to claim 11, wherein portions of a received first speech stream corresponding to the first radio telephone system are removed in order to bring the first speech stream substantially into correlation with a second speech stream corresponding to the second radio telephone system during the handover of a call from the first radio telephone system to the second radio telephone system.

19. A method according to claim 11, for operating in a cellular radio telephone system and a cordless radio telephone system.

20. A method according to claim 19, wherein the cellular radio telephone system is a GSM system and the cordless radio telephone system is a DECT system.

\* \* \* \* \*